United States Patent
Monk et al.

(10) Patent No.: US 7,409,969 B2
(45) Date of Patent: *Aug. 12, 2008

(54) LIQUID TANK PUNCTURE REPAIR KIT

(76) Inventors: Russell Allen Monk, 220 Culver La. South, Salem, OR (US) 97302; Thomas Stegen Ohnstad, 4468 Independence Dr. SE., Salem, OR (US) 97302; James Jackson Milham Henry, 6995 SW. Highland Ct., Wilsonville, OR (US) 97070

(*) Notice: Subject to any disclaimer, the term of this patent is extended or adjusted under 35 U.S.C. 154(b) by 0 days.

This patent is subject to a terminal disclaimer.

(21) Appl. No.: 11/346,931

(22) Filed: Feb. 4, 2006

(65) Prior Publication Data

US 2006/0272723 A1 Dec. 7, 2006

Related U.S. Application Data

(63) Continuation of application No. 11/067,565, filed on Feb. 25, 2005, now Pat. No. 7,044,166.

(60) Provisional application No. 60/627,628, filed on Nov. 11, 2004.

(51) Int. Cl.
*F16L 55/17* (2006.01)

(52) U.S. Cl. ............... 138/99; 138/97; 428/63; 220/560.03

(58) Field of Classification Search ............. 138/99, 138/97, 98; 428/63; 220/560.03, 327, 228, 220/567.2, 562, 900, 560.02; 137/315.01
See application file for complete search history.

(56) References Cited

U.S. PATENT DOCUMENTS

| | | | | |
|---|---|---|---|---|
| 3,509,016 A | * | 4/1970 | Wickersham, Jr. et al. | 220/560.02 |
| 3,583,593 A | * | 6/1971 | Merritt | 220/560.02 |
| 3,801,425 A | * | 4/1974 | Cook | 428/36.2 |
| 4,088,240 A | * | 5/1978 | San Miguel | 220/560.02 |
| 7,044,166 B1 | * | 5/2006 | Monk et al. | 138/99 |
| 7,169,452 B1 | * | 1/2007 | Monk et al. | 428/35.7 |

\* cited by examiner

*Primary Examiner*—Patrick F Brinson
(74) *Attorney, Agent, or Firm*—Jon M. Dickinson, PC; Robert D. Varitz, PC

(57) ABSTRACT

Structure, for sealing, from the outside, a liquid-leaking puncture wound in the wall of a liquid container. This structure includes a patch body having a perimetered cavity selectively securable via a self-torque-limiting bolt to the outside of such a container in a manner whereby the cavity overlies and faces the wound, with the cavity's perimeter surrounding the wound, and a patch pellet contained and confined in the cavity, and formed, at least in part, of a liquid-reaction substance which, with the patch body secured to the container, reacts to contact with liquid leaking from the container at least by imbibing such liquid and swelling to apply wound-sealing pressure, and more preferably by additionally reacting with leakage liquid to form a sticky coagulant mass for aiding in applying sealing pressure to the wound. The patch body may either be placed directly against the outside of a container or may be employed with an intermediate, resilient gasket which centralizes the symmetrical introduction of leakage liquid into the pellet-containing cavity in the patch body.

3 Claims, 5 Drawing Sheets

LIQUID TANK PUNCTURE REPAIR KIT

CROSS-REFERENCE TO RELATED APPLICATIONS

This application is a continuation from Regular U.S. patent application Ser. No. 11/067,565, filed Feb. 25, 2005, now U.S. Pat. No. 7,044,166 B1, granted May 16, 2006, for "Liquid Tank Puncture Repair Kit and Method" which claims priority to U.S. Provisional Patent Application Ser. No. 60/627,628, filed Nov. 11, 2004, for "Fluid Tank Puncture Repair Kit and Method". The entire disclosure contents of that predecessor, Regular U.S. Patent Application, and of the mentioned, prior filed U.S. Provisional Patent Application, are hereby incorporated herein by reference.

BACKGROUND AND SUMMARY OF THE INVENTION

This invention pertains to structure (a repair kit) for patching a leak of liquid from a puncture wound in the wall of a liquid container. Two, different preferred embodiments of, and manners of practicing, the invention are described and illustrated herein in the setting of making an emergency, from-the-outside, repair of a ballistic (such as from a bullet) puncture wound in the container wall of a military vehicle fuel tank—a setting wherein the invention has been proven to offer significant defensive advantage in a combat zone. As will be seen, the two, herein-disclosed embodiments of the invention differ in component count, and in specific leak-sealing methodology.

While, as will become apparent, the invention has significant utility in other settings, it is illustrated and described herein in a military vehicle setting which serves to highlight the key features of the invention.

A special characteristic of the invention in its preferred form is that it includes a wound-patching component which possesses a "substance", referred to herein as a liquid-reaction substance, that reacts to leaking liquid, such as hydrocarbon fuel, to create a collaboration with such liquid thereby to produce a fluid-and-"substance" triggered coagulant that swells to seal a container puncture wound.

Somewhat more broadly viewed, this just-above-mentioned component substance, whether or not effective to create a coagulant mass, nevertheless preferably imbibes leakage liquid, swells in size, and, with the structure of the invention positioned adjacent a container puncture wound for use, is confined and stabilized in such a manner that, in its swelling and ultimately swollen conditions, it applies progressively increasing, and ultimately robust, sealing pressure to close the wound.

In one embodiment of the invention, what is referred to herein as a patch body has a perimeter portion which directly engages the effective outside surface of a container to seal thereagainst in the implementation of puncture-wound sealing. In another disclosed and illustrated embodiment of the invention, a unique, washer-like, resilient sealing gasket is employed intermediate the just-mentioned perimeter portion of the patch body and a container's outside surface. This gasket functions to implement a somewhat different wound-sealing methodology. In both embodiments of the invention as illustrated herein, a unique hollow-stem, self-torque-limiting bolt is preferably utilized to make an attachment to the outside of a container of the type possessing a self-healing puncture-defeating coating which is there applied to the container.

Another feature of the invention comes into play in a circumstance, described herein, where the container whose puncture wound is to be sealed is itself externally coated with an intended self-sealing coating which is formed with a liquid-reaction material ("substance") which is compatible with that employed in the patch-kit structure and practice of the present invention. In this kind of setting, the sealing response behavior of the invention uniquely collaborates with the self-sealing capabilities of such a coating.

All of the features and advantages of the invention will become more fully apparent as the description which now follows is read in conjunction with the accompanying drawings.

DETAILED DESCRIPTION OF THE INVENTION

Figure 1:
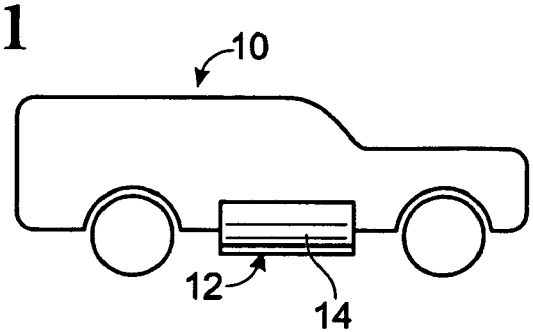
FIG. 1 is a simplified, small-scale side view of a military vehicle which possesses an exposed, side-mounted fuel tank (liquid container). This illustrated tank is one which is coated with an intended self-sealing coating of the type mentioned above.

Turning now to the drawings, and referring first to FIGS. 1-4, inclusive, shown at 10 in FIG. 1 is a military vehicle which possesses an exposed, side-mounted hydrocarbon fuel tank 12, also referred to herein as a liquid container. Fuel in this tank is typically under a residual, above-atmospheric pressure attributable principally to the vapor pressure of the contained fuel per se. This residual pressure might typically be as high as about 4- to about 5-psi above atmosphere pressure. Such a condition, of course, exacerbates fuel leakage if the tank is punctured, as by a bullet.

It should be understood that the word "container" as employed herein is not confined to meaning only a vehicle's fuel tank. It may also apply, as examples, to a conduit, to a fuel-supply tanker, to holding tanks, to rail tanker cars, and to other kinds of liquid containers.

Figure 3:
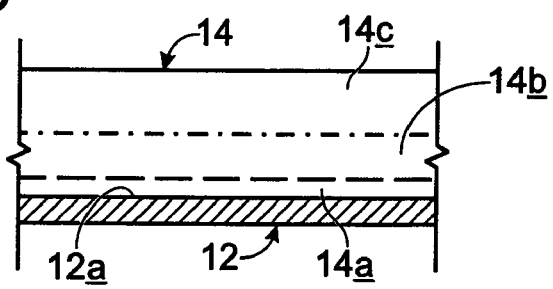
FIG. 3 is a further enlarged, fragmentary cross-sectional view of the mentioned fuel tank and its outer coating taken generally along the line 3-3 in FIG. 2.

While it is not necessary that tank 12 be coated with a self-sealing protective jacket, or skin, 14, tank 12 herein is so coated, and the illustrated and described preferred embodiment of the invention will be seen to have special "collaborative" utility in the presence of such a coating. FIG. 3 illustrates coating 14 in cross section.

Coating 14 herein includes, effectively, a stack of three layers 14a, 14b, 14c. Layer 14a lies directly against the outside surface 12a of tank 12, has a thickness herein of about ⅛-inches, and is formed of an elastomer, such as the product sold under the trademark TUFF STUFF® (FR (fire resistant) made by Rhino Linings USA, Inc. in San Diego, Calif. Layer 14b (shown abutting layer 14a at the location of a dashed line in FIG. 3) has a thickness herein of about ⅛- to about 3/16-inches, and is formed of a composite of the same elastomer material just mentioned for layer 14a, and entrained (about 20% by weight) fuel imbiber beads (not specifically shown in FIGS. 1-4, inclusive) such as those bearing the product identifier IMB230300 made by Imbibitive Technologies America, Inc. in Midland, Mich. Layer 14c (shown abutting layer 14b at the location of a dash-dot line in FIG. 3) has a thickness herein of about ¼- to about ⅜-inches, and is formed of the same elastomer material which is employed in layer 14a. The outer side of layer 14c defines the outside surface of coating 14.

Both of the fundamental materials which are employed in coating 14 herein are referred to as being liquid-reaction substances. The term "reaction substances" refers to the fact that when hydrocarbon leakage fuel from tank 12 contacts these materials, a chemical/mechanical reaction takes place which causes material-imbibing of such fuel, and volume-swelling of the imbibing material. Additionally, and preferably though not necessarily, a congealing/coagulating reaction occurs with respect to the interaction which occurs between leakage fuel and the imbiber beads, which reaction produces a sticky coagulant mass that, as will be seen, significantly contributes to the puncture-sealing capability of the present invention.

Figure 2:
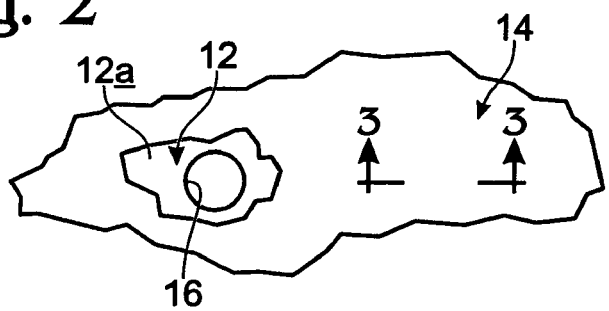
FIG. 2 is an enlarged, fragmentary view of a portion of the fuel tank shown in FIG. 1, wherein a penetrating bullet wound (puncture) has just occurred. Around this puncture, a small portion of a special, nominally self-sealing, tank coating has been broken away to provide a clearer view of the mentioned wound, and of the direct outside surface of the fuel tank.
Figure 4:
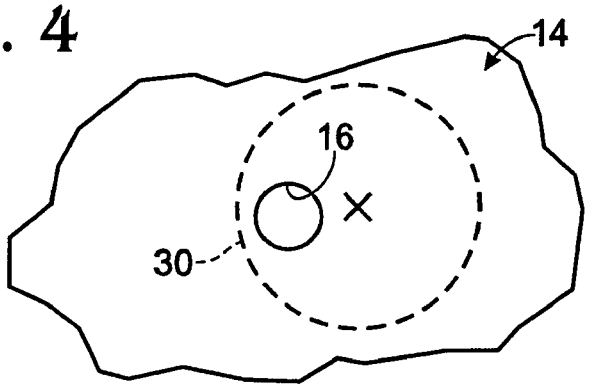
FIG. 4 presents a view similar to that provided in FIG. 2 showing the mentioned puncture wound, and picturing (in dashed lines) the intended footprint of a wound patch sealing structure which will be employed in accordance with the present invention to seal the illustrated wound.

In FIGS. 2 and 4, shown at 16 is a bullet wound puncture, also referred to herein as a liquid-leaking puncture wound, in the wall of container 12. And, while coating 14 nominally is deemed to be capable of sealing this wound on its own, the structure of the present invention and its behavior come into play when this does not happen.

Adding attention now to FIGS. 5-9, inclusive, in the drawings, one embodiment of the patch kit structure of the present invention is shown generally at 18. Structure 18 includes a patch body 20 possessing the shape, generally, of a cylindrical hockey puck, formed of a suitable rubber material, and including, on one of its circular sides, a domed patch cavity 20a which is perimetered by downwardly facing, annularly ribbed perimeter structure 20b which is seen to include ribs 20c. An annular steel washer 22 is embedded in body 20 as shown (except in the exploded illustration of FIG. 5). Body 20 has an outside diameter preferably of about 3-inches, with the diameter of the edge rim of cavity 20a being about 2½-inches.

Figure 5:
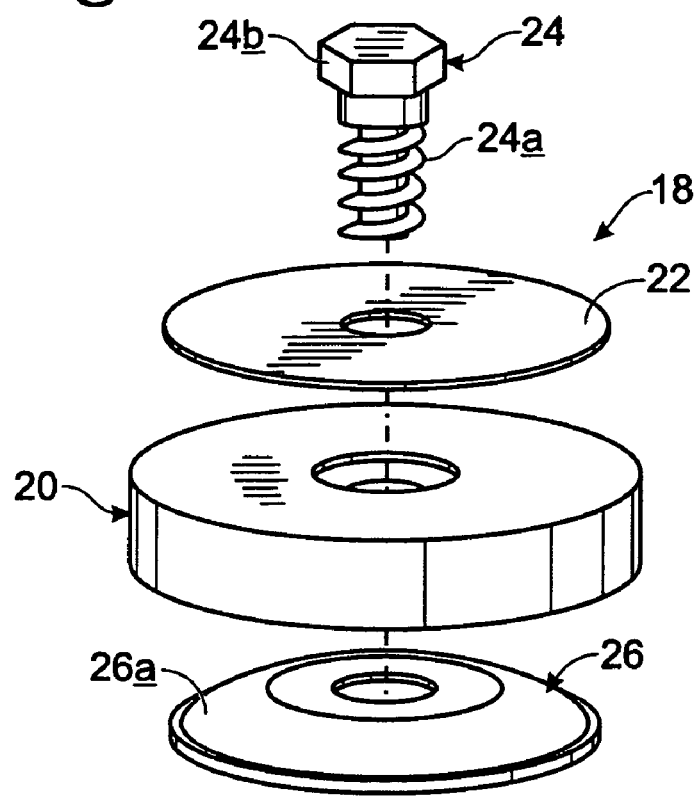
FIG. 5 is a somewhat enlarged and exploded view which isolates and shows each of the several components of one embodiment of the patch sealing kit structure of the invention.
Figure 6:
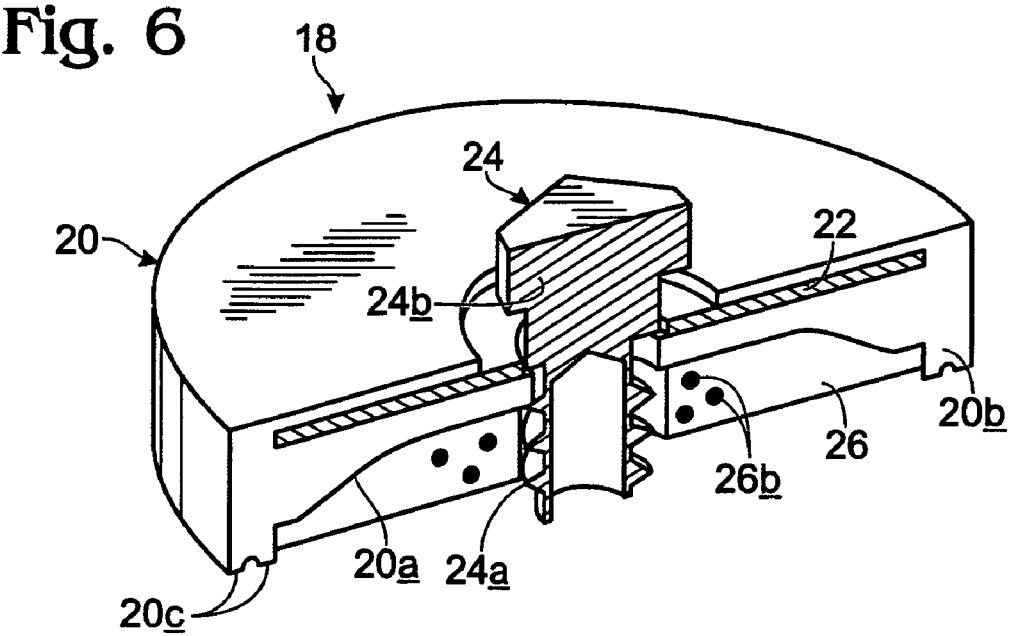
FIG. 6 is a still further enlarged, isolated, isometric and fragmentary view showing the same embodiment of the patch sealing structure proposed by the present invention which is illustrated in FIG. 5. In this figure, all components in this kit embodiment are also shown, including a patch body with a perimetered cavity, an embedded washer in this body, what is referred to herein as a patch pellet which includes a special substance described in this document, as mentioned above, as being a liquid-reaction substance, and a specially designed, hollow-shank, threaded patch-body anchoring bolt.
Figure 7:
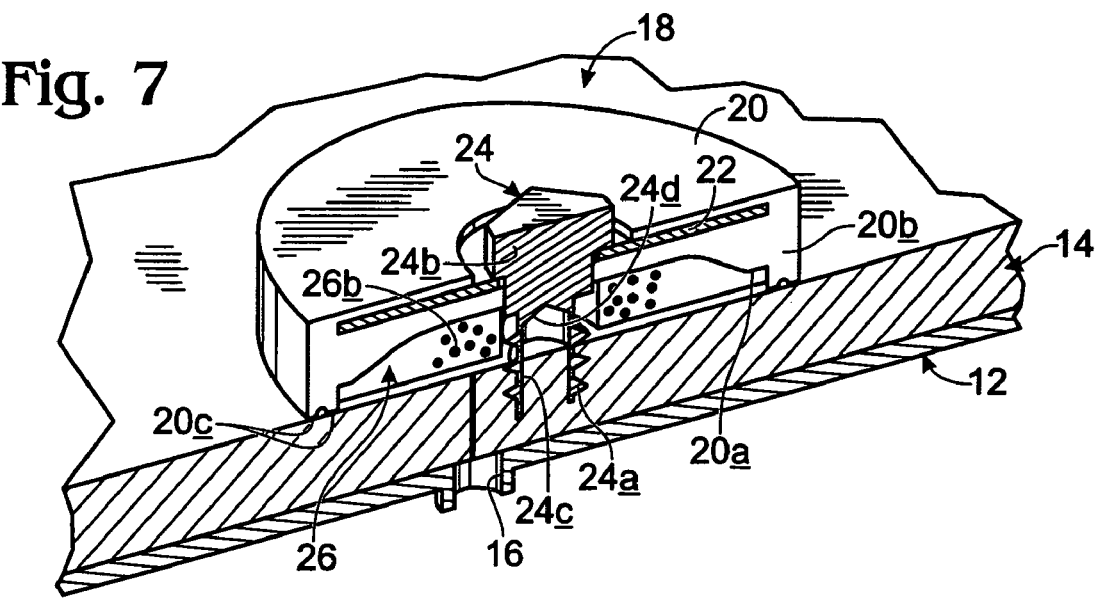
FIG. 7, which is presented on about the same scale employed in FIG. 6, shows a cross-sectional, isometric view of the patch kit of this invention, as illustrated in FIG. 6, in an operative condition sealing a puncture (bullet) wound in a fuel tank.
Figure 8:
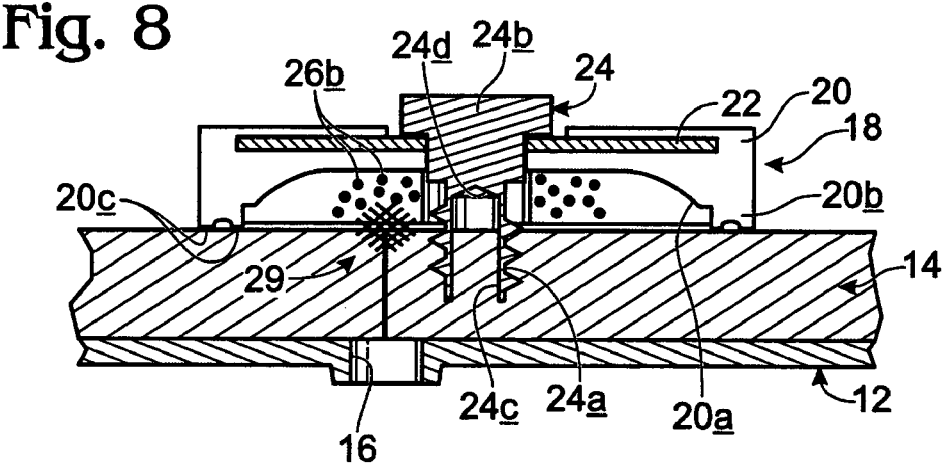
FIG. 8 is a transverse, cross-sectional view illustrating essentially the same information contained isometrically in FIG. 7, and additionally illustrating what is referred to herein as a coagulant mass which develops during preferred practice of the invention to aid in the important wound-sealing behavior of the invention.
Figure 9:
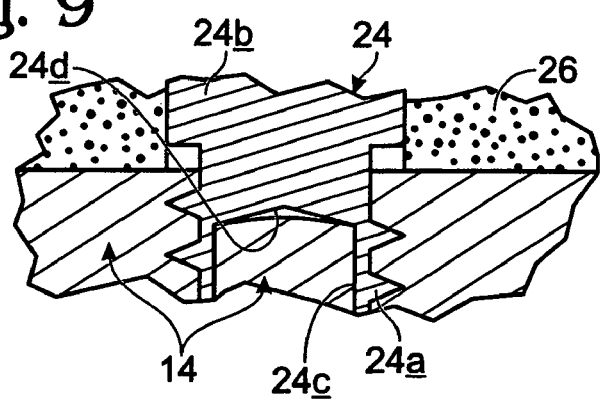
FIG. 9 presents an enlarged detail, drawn from near the center of FIG. 8, illustrating how a specially designed, unique, hollow-shank bolt in the kit of this invention accommodates self-torque-limiting securement of other components in the invention to a punctured liquid container whose outside surface is coated, per se, with a certain kind of penetration-sealing material which is physically compatible (i.e., somewhat like) material employed in the structure of the invention.
Figure 10:
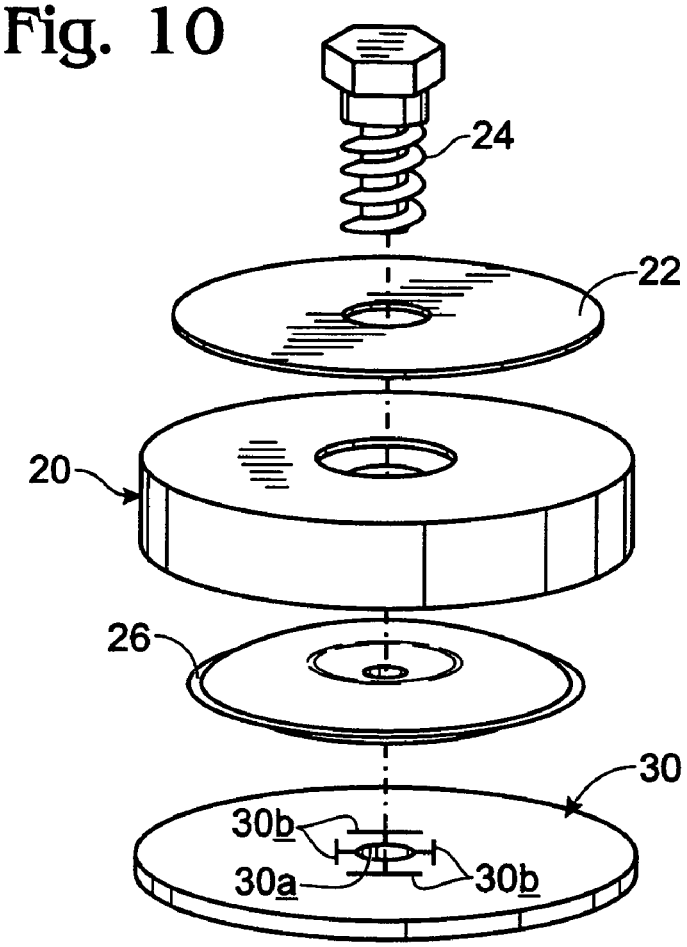
FIG. 10 is like FIG. 5, except that it illustrates the above-mentioned, gasket-employing embodiment of the invention.

Washer 22 and body 20 are centrally apertured, as can be seen, to provide operative clearance for the elongate, threaded shank 24a of a hex bolt 24 which has a hex head 24b and a central long axis 24c (see FIGS. 4 and 5). As can be seen in FIGS. 6-8, inclusive, the upper portion of the central aperture in body 20 is exposed for ultimate bearing contact (as will be explained) between embedded washer 22 and the underside of bolt head 24b. The end of shank 24a which is opposite the end joined to bolt head 24b has an elongate, hollow, cylindrical interior region 24c, the inner (upper) end of which is closed at 24d. Bolt 24 functions herein as an attaching device, or mechanism, especially suited for use with a container like tank 12 which is coated with a modest thickness (about ⅝-inches) self-sealing coating, like coating 14. As will be further explained shortly, bolt 24 is also referred to herein as a self-tapping, self-torque-limiting bolt.

Shown at 26 recessed within cavity 20a in FIGS. 6-8, inclusive, is what is referred to herein as a patch pellet which is flat-annular in configuration, and formed with a suitable wicking-fabric material 26a (see FIG. 5) shaped as an annular bag, or outer envelope, which holds a fill of the same reaction-substance beads mentioned earlier herein. A few of such beads are shown generally and schematically at 26b in FIGS. 6-8, inclusive.

In FIG. 6, structure 18 is shown assembled for use before attachment to a punctured container. In FIGS. 7 and 8, structure 18 has been attached effectively to tank 12 (via screw securement to coating 14) to seal against fuel leakage from previously mentioned bullet puncture wound 16 which has not been healed by coating 14.

To seal against fuel (liquid) leakage from wound 16, with structure 18 pre-assembled as shown in FIG. 6, body 20 is placed to seat perimeter structure 20b against the exposed outside surface of coating 14, with the "footprint" of the body generally relating to puncture wound 16 as illustrated by a dashed-line circle 28 in FIG. 4. With this disposition established, wound 16 is effectively located within the perimeter rim of cavity 20a, and bolt 24 is sufficiently laterally offset, preferably about ½-inches, from the puncture wound so that it is "aimed", so-to-speak, at an unpunctured portion of coating 14.

Bolt 24 is then pressed against coating 14, and thereafter screwed in a self-tapping manner to tightness, as follows. The unique hollow end of the shank in the bolt screws self-tappingly into coating 14—cutting an annular and deepening, threaded path into the coating until the inner "end" 24d of the hollow interior region 24c of bolt shank 24a engages and begins to bear against the upper surface of the portion of coating 14 which now extends into this hollow interior. By the time that this bearing contact has been established, bolt head 24b is already bearing sufficiently downwardly on washer 22 to begin to drive and compress body perimeter structure 20b against coating 14 in an annular region surrounding wound 16. Bolt tightening continues until sufficient compression exists in the coating material portion which bears against the inner end 24d of the bolt-shank hollow automatically to establish an appropriate "tightness torque".

In FIGS. 7 and 8, shank interior 24c is shown with an exaggerated length, with end 24d shown spaced somewhat upwardly from the portion, 14a of coating 14 which extends upwardly into this interior. This has been done in these two figures simply to provide a clearer illustration here of the inside of shank 24a. In reality, interior end 24d, with the components of the invention positioned substantially as shown in FIGS. 7 and 8, would be bearing firmly and tightly downwardly on coating portion 14a. This condition is clearly pictured if in FIG. 9. This special bolt design thus, through appropriate "interior" length selection which is well within the skill in the relevant art, automatically establishes a proper final torque tightness (self-torque-limiting).

This bolt tightening action attaches and binds (anchors) structure 18 firmly to tank 12 through the connection thus established with coating 14 so as to drive body 20 into secured sealing tightness around the perimeter of cavity 20a.

Later on, if it is desired to add an extra measure of sealing "security" regarding this embodiment of the invention, a ribbon of a suitable urethane caulking material (not illustrated) may be applied around the outside perimeter of body 20 where that perimeter meets with coating 14.

Leaking fuel floods cavity 20a wherein it becomes trapped, and is quickly wicked into pellet 26 to contact beads 26b therein. Pellet 26 is trapped and positionally stabilized in the chamber defined between cavity 20a and the confronting outside surface of coating layer 14c. The beads and fuel promptly react with one another to form, collaboratively, a swelling coagulant which, as it swells, becomes compressed within the small volume of stabilized space which is defined between cavity 20a and the confronting surface of coating 14. The result of this activity is an immediate, full, and secure compressive seal against fuel leakage from tank 12 through wound 16. FIG. 8 illustrates, in dark cross-hatching at 29, a resulting coagulant mass.

An additional matter to note is that, aiding in the leakage-sealing process which is implemented by the behavior of the present invention, is enhanced compression in the zone of the puncture wound, introduced by reactive pressure which develops between coating 14 and external structure body 20 due to tightening of bolt 24, and associated tensing in shank 24a. This tensing condition is referred to herein as a "tension reaction force".

Turning attention now to FIGS. 10-13, inclusive, here there is illustrated an important alternative embodiment of the invention. Those specific components of this embodiment which are essentially the same as like components included in the first-described embodiment, are given, in these four drawings figures, the same respective reference numbers.

This alternative embodiment of the invention includes one additional component in the form of a uniquely configured, annular, resilient gasket 30. Gasket 30 herein has an outside diameter which is slightly greater than that of patch body 20, a thickness of about ⅛-inches, and is formed of a PVC/Nitrile/Neoprene polymer sold under the trademark Duraform™. Specifically, this material is referred to by its manufacturer, Monmouth Rubber & Plastics Corp. of Long Branch, N.J., with an inventory number IVN41.

Figure 11:
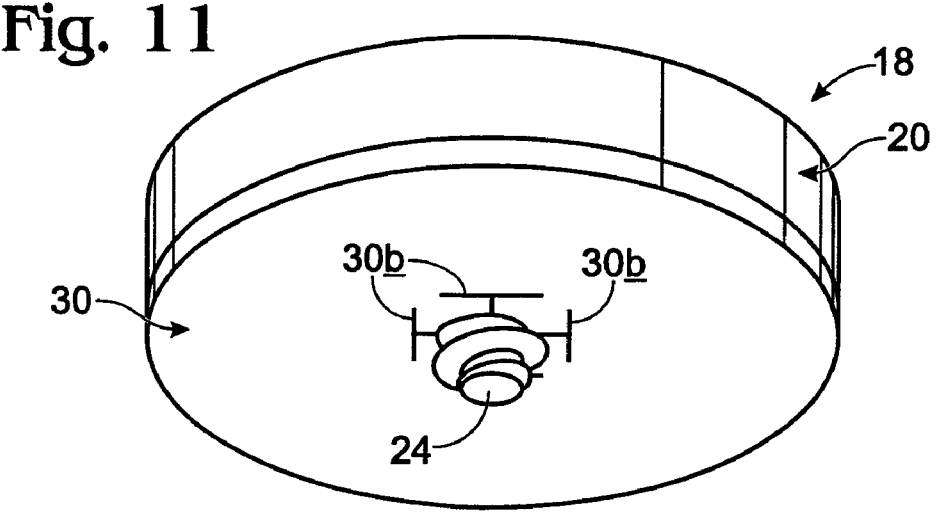
FIG. 11 is a bottom isometric view of the embodiment of FIG. 10, shown with all components assembled and ready for use.
Figure 12:
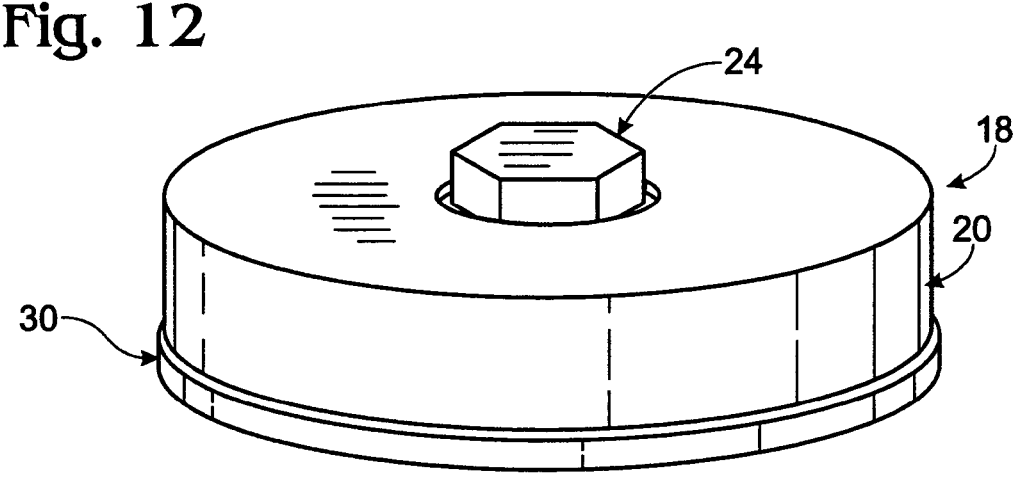
FIG. 12 is a larger-scale, top isometric view which is directly related to what is shown in FIG. 11.
Figure 13:
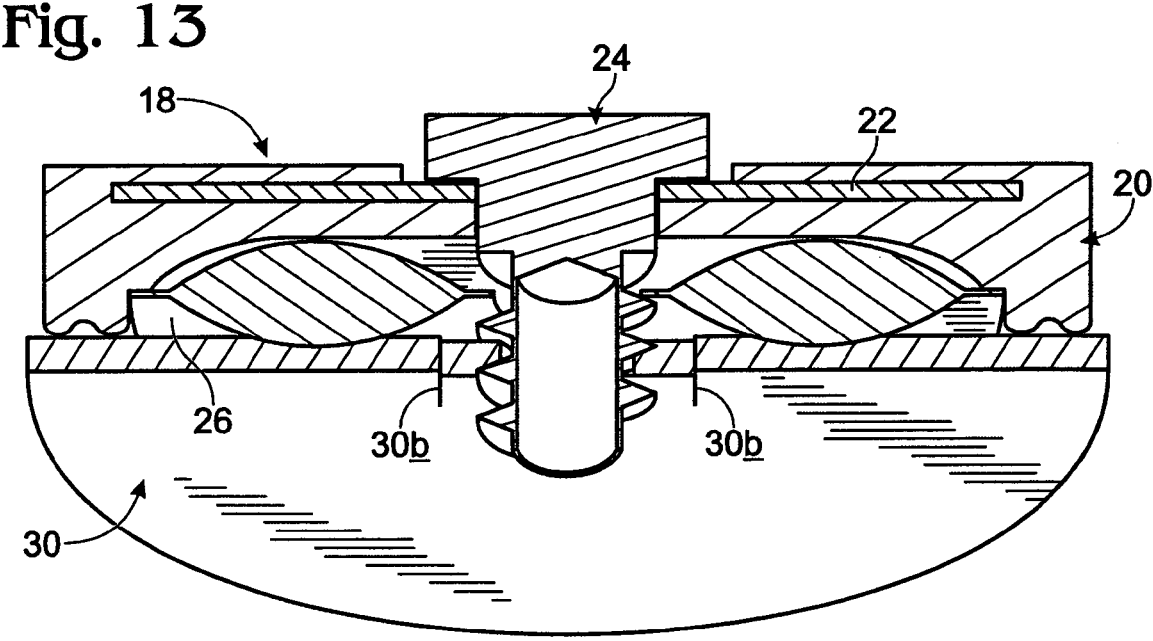
FIG. 13 is a larger scale view, similar to that presented in FIG. 11, but with the structure of FIG. 11 sliced open to reveal details of internal construction.

As can be seen especially well in FIGS. 11 and 13, gasket 30 possesses a central throughbore 30a which accommodates the shank of bolt 24. Gasket 30 is unique in its design, in that plural (four herein), generally T-shaped through-slits 30b are formed at orthogonally related locations distributed circumferentially about throughbore 30a, as can been seen best in FIGS. 10, 11 and 13. Throughbore 30a and through-slits 30b are referred to collectively herein as central passage structure.

Significantly, with the structure of FIGS. 10-13, inclusive, installed for use, slits 30b provide central passageways for the controlled, central symmetrical introduction of leakage liquid into the region containing pellet 26. As the material located centrally in pellet 26 swells in response to contact with this liquid, a very effective, "axially symmetric" (relative to axis 24c) seal develops against the outside of a container, like fuel tank 12. A certain amount of liquid-reaction imbibing and swelling also occurs in the material (mentioned above) which forms gasket 30, and this behavior contributes additionally to the sealing capability of this embodiment of the invention.

It will be understood that this invention may be implemented in various ways which do not necessarily involve dealing with leakage from a container which is jacketed with a coating like coating 14. Where such a coating is, however, involved as described herein, the "reaction substance" portion of the coating clearly collaborates with the patching/sealing structure of the invention. Also the invention may readily be adapted and employed to deal with leaking liquids which are other than hydrocarbon fuel liquid by selecting and employing "reaction substances" which are appropriate to the particular liquid involved. The invention may also be implemented in a manner wherein "liquid reaction" does indeed involve material-swelling, but not necessarily the formation of a coagulant mass. Thus, effective sealing may readily be achieved simply with the use, in pellet 26, of a reaction substance which merely imbibes leakage liquid, and swells appreciably in size as a result.

The structure of this invention is quite clearly very simple in construction, is easily carried for emergency use when required, and is very easily installed quickly for rapid, effective leak stoppage.

From a methodologic perspective, the invention can be expressed in a number of different ways. A few of these ways are set forth immediately below in several, letter-identified paragraph statements, as follows:

Accordingly, while a preferred embodiment of the invention, and certain variations thereof, have been described and illustrated herein, it is appreciated that other variations and modifications may be made without departing from the spirit of the invention.

We claim:

1. Structure for sealing, from the outside, a liquid-leaking puncture wound in the wall of a liquid container comprising
 a patch body having a perimetered cavity selectively securable effectively to the outside of such a container, with said cavity overlying and facing the wound, and said cavity's perimeter surrounding the wound, and
 a patch pellet contained and confined in said cavity and formed, at least in part, of a liquid-reaction substance which, with the patch body secured to the container, reacts on the outside of the container, to a condition of contact with liquid leaking from the container to form, in combination with such liquid, a leakage-flow inhibiting coagulant.

2. The structure of claim 1, wherein said pellet includes an outer envelope formed of a liquid-wicking material, and a fill disposed within that envelope made of a material which absorbs and swells as a reaction consequence of contact with leaking, wicked liquid.

3. Structure for sealing, from the outside, a liquid-leaking puncture wound in the wall of a liquid container comprising
a patch body having a perimetered cavity selectively securable effectively to the outside of such a container, with said cavity overlying and facing the wound, and said cavity's perimeter surrounding the wound on the outside of the container, and
a patch pellet contained and confined in said cavity and formed, at least in part, of a liquid-reaction substance which, with the patch body secured to the container, reacts on the outside of the container to a condition of contact with liquid leaking from the container by imbibing such liquid and swelling.

* * * * *